US012785200B2

(12) United States Patent
Wang et al.

(10) Patent No.: US 12,785,200 B2
(45) Date of Patent: Nov. 3, 2026

(54) BATTERY AND ELECTRONIC DEVICE USING SAME

(71) Applicant: BYD COMPANY LIMITED, Shenzhen (CN)

(72) Inventors: Feng Wang, Shenzhen (CN); Liangliang Huang, Shenzhen (CN); Jingguo Wang, Shenzhen (CN); Shuang Zhu, Shenzhen (CN); Yudong Lei, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 683 days.

(21) Appl. No.: 18/214,984

(22) Filed: Jun. 27, 2023

(65) Prior Publication Data

US 2023/0344065 A1 Oct. 26, 2023

Related U.S. Application Data

(63) Continuation of application No. PCT/CN2022/074405, filed on Jan. 27, 2022.

(30) Foreign Application Priority Data

Mar. 30, 2021 (CN) ......................... 202110339414.7

(51) Int. Cl.
*H01M 50/298* (2021.01)
*H01M 50/209* (2021.01)
(Continued)

(52) U.S. Cl.
CPC ....... *H01M 50/298* (2021.01); *H01M 50/209* (2021.01); *H01M 50/231* (2021.01);
(Continued)

(58) Field of Classification Search
CPC ............. H01M 50/298; H01M 50/209; H01M 50/231; H01M 50/296; H01M 50/51;
(Continued)

(56) References Cited

U.S. PATENT DOCUMENTS 9,040,187 B2 * 5/2015 Bhardwaj ........... H01M 10/052 429/94
9,917,325 B2 3/2018 Bhardwaj et al.
(Continued)

FOREIGN PATENT DOCUMENTS

CN 1161848 C 8/2004
CN 102332599 A 1/2012
(Continued)

OTHER PUBLICATIONS

International Search Report and Written Opinion for Application No. PCT/CN2022/074405, mailed on Apr. 26, 2022, 10 pages.
(Continued)

*Primary Examiner* — Daniel H Lee
(74) *Attorney, Agent, or Firm* — Sheppard Mullin Richter & Hampton LLP

(57) ABSTRACT

A battery includes a housing, multiple electrode cores, and a connection wiring. At least two of the electrode cores have different heights, and each of the electrode cores includes a lead-out portion. The housing has multiple outward protrusions forming multiple accommodating grooves inside the housing, and the accommodating grooves respectively match dimensions of the electrode cores to accommodate the electrode cores. The connection wiring is accommodated in the housing and disposed based on a connection relationship of the electrode cores and positions of the lead-out portions to electrically connect the electrode cores, where the connection relationship comprises a serial connection or a parallel connection. The connection wiring comprises an
(Continued)

100 output terminal, and the output terminal extends out of the housing for leading out power.

20 Claims, 4 Drawing Sheets

(51) Int. Cl.
*H01M 50/231* (2021.01)
*H01M 50/296* (2021.01)
*H01M 50/51* (2021.01)
*H01M 50/512* (2021.01)

(52) U.S. Cl.
CPC ......... *H01M 50/296* (2021.01); *H01M 50/51* (2021.01); *H01M 50/512* (2021.01)

(58) Field of Classification Search
CPC ............. H01M 50/512; H01M 50/509; H01M 2220/30; H01M 50/247; H01M 50/244; H01M 50/204; H01M 50/502; Y02E 60/10
See application file for complete search history.

(56) References Cited

U.S. PATENT DOCUMENTS

| | | | | |
|---|---|---|---|---|
| 10,749,155 | B2 | 8/2020 | Oh et al. | |
| 2011/0183169 | A1* | 7/2011 | Bhardwaj | H01M 10/0431 29/623.2 |
| 2016/0093861 | A1* | 3/2016 | Rockford | H01M 50/507 429/121 |
| 2016/0241048 | A1 | 8/2016 | Badam et al. | |
| 2016/0336562 | A1* | 11/2016 | Oh | H01M 50/291 |
| 2017/0092994 | A1 | 3/2017 | Canfield et al. | |
| 2017/0262018 | A1 | 9/2017 | Kim et al. | |
| 2018/0151907 | A1 | 5/2018 | Bhardwaj et al. | |

FOREIGN PATENT DOCUMENTS

| | | | |
|---|---|---|---|
| CN | 103378337 | A | 10/2013 |
| CN | 103579682 | A | 2/2014 |
| CN | 102332599 | B | 11/2015 |
| CN | 104081560 | B | 7/2016 |
| CN | 105914037 | A | 8/2016 |
| CN | 106575730 | A | 4/2017 |
| CN | 107799799 | A | 3/2018 |
| CN | 207124250 | U | 3/2018 |
| CN | 111276642 | A | 6/2020 |
| EP | 1753050 | B1 | 6/2013 |
| EP | 2966718 | A1 | 1/2016 |
| EP | 3528312 | A1 | 8/2019 |
| JP | H04293957 | A | 10/1992 |
| JP | 2001167743 | A | 6/2001 |
| JP | 2013084570 | A | 5/2013 |
| JP | 2015149280 | A | 8/2015 |
| JP | 2016171082 | A | 9/2016 |
| KR | 20030066960 | A | 8/2003 |
| KR | 20050030039 | A | 3/2005 |
| KR | 100614375 | B1 | 8/2006 |
| KR | 10-2020-0074741 | A | 6/2020 |
| WO | 2016/032106 | A1 | 3/2016 |
| WO | 2018/163495 | A1 | 9/2018 |
| WO | 2019/059133 | A1 | 3/2019 |

OTHER PUBLICATIONS

Notice of Reasons for Refusal dated Aug. 20, 2024, issued in Japanese Patent Application No. 2023-540642, with English machine translation (17 pages).
Extended European Search Report dated Nov. 5, 2024, issued in European Patent Application No. 22778350.3 (11 pages).
First Office Action and Search Report dated Apr. 20, 2023, issued in Chinese Patent Application No. 202110340406.4, with English machine translation (15 pages).
Second Office Action dated Sep. 12, 2023, issued in Chinese Patent Application No. 202110340406.4, with English machine translation (15 pages).
Request for the Submission of an Opinion dated Aug. 11, 2025, issued in Korean Patent Application No. 10-2023-7022127, with English machine translation (11 pages).
Examination Report dated Jul. 29, 2025, issued in Indian Patent Application No. 202327044133 (6 pages).
PCT International Search Report and the Written Opinion mailed Apr. 28, 2022, issued in International Application No. PCT/CN2022/074404, with English machine translation (12 pages).
Notice of Reasons for Refusal dated Oct. 8, 2024, issued in Japanese Patent Application No. 2023-540645, with English machine translation (9 pages).
Notice of Reasons for Refusal dated Mar. 25, 2025, issued in Japanese Patent Application No. 2023-540645, with English machine translation (12 pages).
Decision of Refusal dated Sep. 2, 2025, issued in Japanese Patent Application No. 2023-540645, with English machine translation (8 pages).
Extended European Search Report dated Aug. 5, 2024, issued in European Patent Application No. 22778351.1 (11 pages).
First Office Action and Search Report dated Apr. 21, 2023, issued in Chinese Patent Application No. 202110339414.7, with English machine translation (15 pages).
Second Office Action dated Sep. 13, 2023, issued in Chinese Patent Application No. 202110339414.7, with English machine translation (15 pages).
Request for the Submission of an Opinion dated Apr. 8, 2025, issued in Korean Patent Application No. 10-2023-7021913, with English machine translation (13 pages).

* cited by examiner

BATTERY AND ELECTRONIC DEVICE USING SAME

CROSS-REFERENCE TO RELATED APPLICATIONS

This application is a Continuation Application of International Patent Application No. PCT/CN2022/074405, filed on Jan. 27, 2022, which is based on and claims priority to and benefits of Chinese Patent Application No. 202110339414.7, filed on Mar. 30, 2021 and entitled "BATTERY AND ELECTRONIC DEVICE USING SAME". The entire content of all of the above-referenced applications is incorporated herein by reference.

FIELD

The present disclosure relates to the field of batteries, and more particularly, to a battery and an electronic device using same.

BACKGROUND

Electronic devices, such as laptops, tablets, and mobile phones, are increasingly designed to be light and thin due to aesthetic and portability requirements. Generally, an overall dimension and an arrangement of a functional component inside the electronic device vary, but a battery, as a key component, is substantially mounted in the same manner. That is to say, a separate battery compartment needs to be arranged in advance for the battery, and the battery and battery compartment have basically regular shapes. In order to avoid other functional components, use of a part of the space needs to be given up, which is not conducive to the lightness and thinness of the electronic device, so there is room for improvement.

SUMMARY

Based on the above, the present disclosure discloses a battery and an electronic device using same, which provides a battery structure that can improve a space utilization rate inside the electronic device and help realize lightness and thinness of the electronic device.

The solutions are as follows.

A first aspect provides a battery, including:

multiple electrode cores, at least two of the electrode cores having different heights; and each of the electrode cores including a lead-out portion;

a housing, having multiple outward protrusions forming multiple accommodating grooves inside the housing; and the accommodating grooves respectively matching dimensions of the electrode cores to accommodate the electrode cores; and a connection wiring, accommodated in the housing and disposed based on a connection relationship of the electrode cores and positions of the lead-out portions to electrically connect the electrode cores, where the connection relationship includes a serial connection or a parallel connection; the connection wiring includes an output terminal; and the output terminal extends out of the housing for leading out power.

In an embodiment, the connection wiring further includes a wire portion, disposed on circumferences of the electrode cores based on the connection relationship of the electrode cores and the positions of the lead-out portions;

multiple connecting portions, disposed on the wire portion and electrically connected with the lead-out portions respectively; and the output terminal is disposed on the wire portion.

In an embodiment, the wire portion includes multiple wire sections disposed based on the connection relationship and the positions of the lead-out portions. At least one of the connecting portions and the output terminal is integrally formed with one of the wire sections.

In an embodiment, adjacent electrode cores are spaced apart by a gap; and a part of the wire portion located between the adjacent electrode cores is embedded in the gap.

In an embodiment, the housing includes:

a first packaging film; and a second packaging film, the first packaging film recessed away from the first packaging film to form the accommodating grooves.

In an embodiment, the lead-out portions of the electrode cores and the connection wiring are disposed closer to the first packaging film than to the second packaging film.

In an embodiment, circumferential sides of the first packaging film and the second packaging film include an edge sealing portion, and the circumferential sides of the first packaging film and the second packaging film are sealed and connected through the edge sealing portions. The circumferential sides of the first packaging film and the second packaging film are sealed and connected through the edge sealing portions, the output terminal extends out of the housing from the two edge sealing portions, and the output terminal is hermetically connected with a corresponding position of the edge sealing portion through the sealant layer.

In an embodiment, an outer side of the wire portion is covered with an insulating film.

In an embodiment, at least two of the multiple electrode cores have different widths and/or have different lengths.

A second aspect of the present disclosure discloses an electronic device, including:

an enclosure, having an accommodating space; and multiple functional devices, mounted to the enclosure and occupying in the accommodating space.

The electronic device further includes the battery. The battery substantially occupies the rest of the accommodating space.

Among the battery and electronic device, the multiple electrode cores of the battery have predetermined overall dimensions and are arranged/disposed in predetermined positions, which can be adapted to the arrangement of the functional devices of the electronic device. At least two electrode cores have different heights, and the electrode cores can be arranged/disposed in a mutual avoidance relationship with the multiple functional devices. That is to say, when the battery is placed in the accommodating space, the functional devices of the electronic device occupy a part of the accommodating space. For the battery, the overall dimension and the position of the electrode core is preset according to the arrangement of the functional devices, and the electrode core is set to a height that matches the corresponding positions of the functional devices. As a result, the battery substantially occupies the rest of the accommodating space, and realizes the full utilization of the accommodating space. Meanwhile, the connection wiring is accommodated in the housing and disposed based on a predetermined serial/parallel connection relationship of the multiple electrode cores and positions of the lead-out portions to electrically connect the multiple electrode cores. Wires are arranged/disposed in the housing of the battery, and the predetermined serial/parallel connection of the electrode core is realized. The output terminal extends out of the housing for electrical lead-out, which can simplify an external circuit and reduce occupation of an internal space of the electronic device by an external circuit and a component.

BRIEF DESCRIPTION OF THE DRAWINGS

The above-mentioned advantages of the present disclosure are described in detail below in conjunction with the accompanying drawings.

REFERENCE NUMERALS

Figure 1:
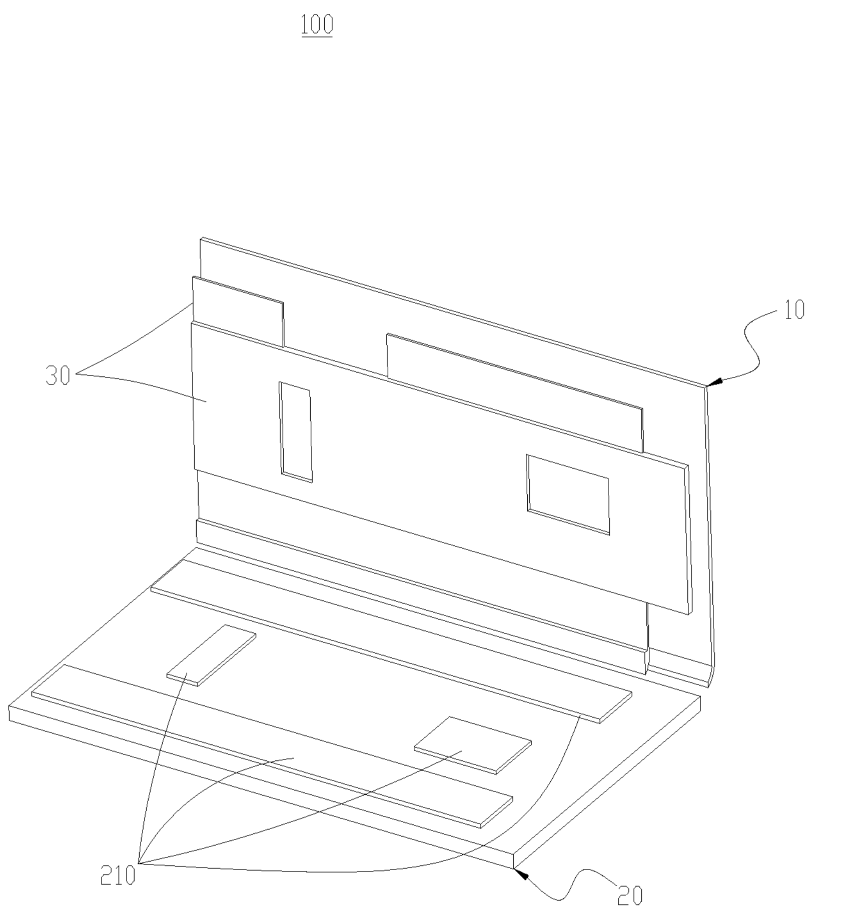
FIG. 1 is a schematic exploded structural view of an electronic device according to an embodiment.

10: Enclosure
20: Battery
30: Functional device
100: Electronic device
110: Accommodating space
210: Housing
220: Electrode core
230: connection wiring
240: Insulating film
2101: Accommodating groove
2110: First packaging film
2120: Second packaging film
2201: Lead-out portion
2210: First electrode core
2220: Second electrode core
2230: Third electrode core
2240: Fourth electrode core
2250: Fifth electrode core
2301: Wire portion
2302: Connecting portion
2303: Output terminal
2310: First wire section
2320: Second wire section
2330: Third wire section
2340: Fourth wire section

DETAILED DESCRIPTION

The embodiments of the present disclosure are described in detail below, and the embodiments described with reference to accompanying drawings are only some of the embodiments of the present disclosure.

Figure 2:
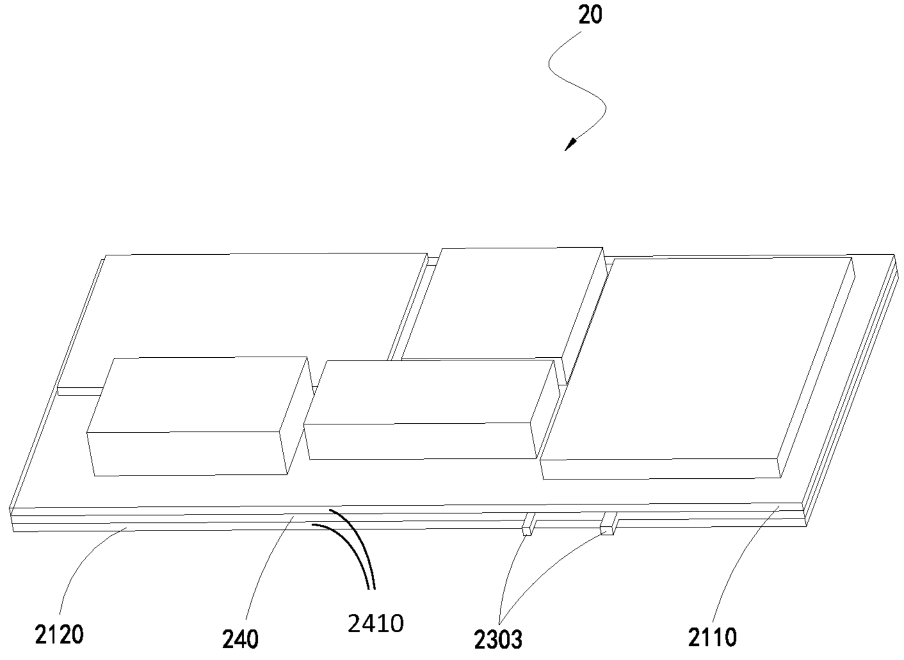
FIG. 2 is a schematic structural diagram of a battery in the electronic device shown in FIG. 1.

As shown in FIG. 1 and FIG. 2, the electronic device 100 includes an enclosure 10, a battery 20, and a functional device 30. The enclosure 10 has an accommodating space 110 formed therein, which is configured to accommodate the battery 20 and the functional device 30.

The enclosure 10 is generally in a regular shape, for example, the enclosure 10 is substantially in a rectangular shape. Correspondingly, the accommodating space inside the enclosure 10 is also substantially a regular shape, for example, the accommodating space is also rectangular, and the embodiments are not limited herein. In practice, the enclosure 10 and the accommodating space 110 inside the housing are usually regular shapes. Meanwhile, the electronic device 100 generally needs to include various types of functional devices 30 having different specifications and shapes. After these functional devices 30 are accommodated in the accommodating space 110, the space occupied together is correspondingly irregular. Generally, the enclosure 10 is provided with or includes an independent battery compartment, and the battery compartment is in a regular shape to facilitate design and processing. The battery compartment needs to avoid the functional device 30 as a whole, resulting in unavailability of a number of irregular spaces.

Based on the above, in the electronic device 100 disclosed in the present disclosure, the functional device 30 is mounted to the enclosure 10 and occupies a part of the accommodating space 110, and the battery 20 substantially occupies the rest of the accommodating space 110. It should be noted that the "substantially" here means that the foregoing remaining space may not be completely occupied due to factors such as a machining accuracy limitation, an assembly requirement, and an electrical safety requirement. Therefore, the battery 20 can generally occupy the rest of the accommodating space 110, and the battery 20 and the functional device 30 avoid each other and complement each other in volume to use the volume of the accommodating space 110 as much as possible.

Figure 3:
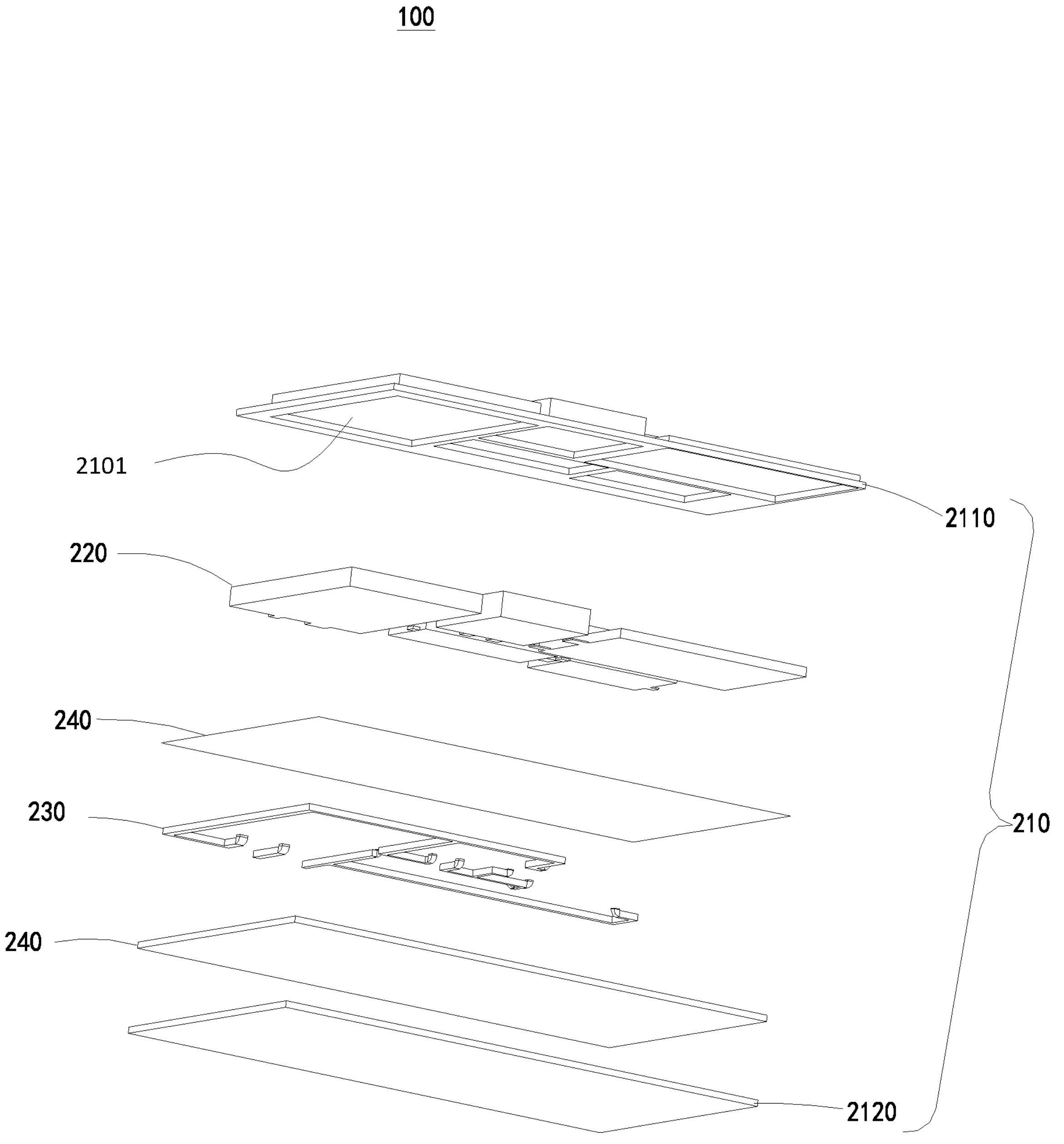
FIG. 3 is an exploded view of the battery shown in FIG. 2.
Figure 4:
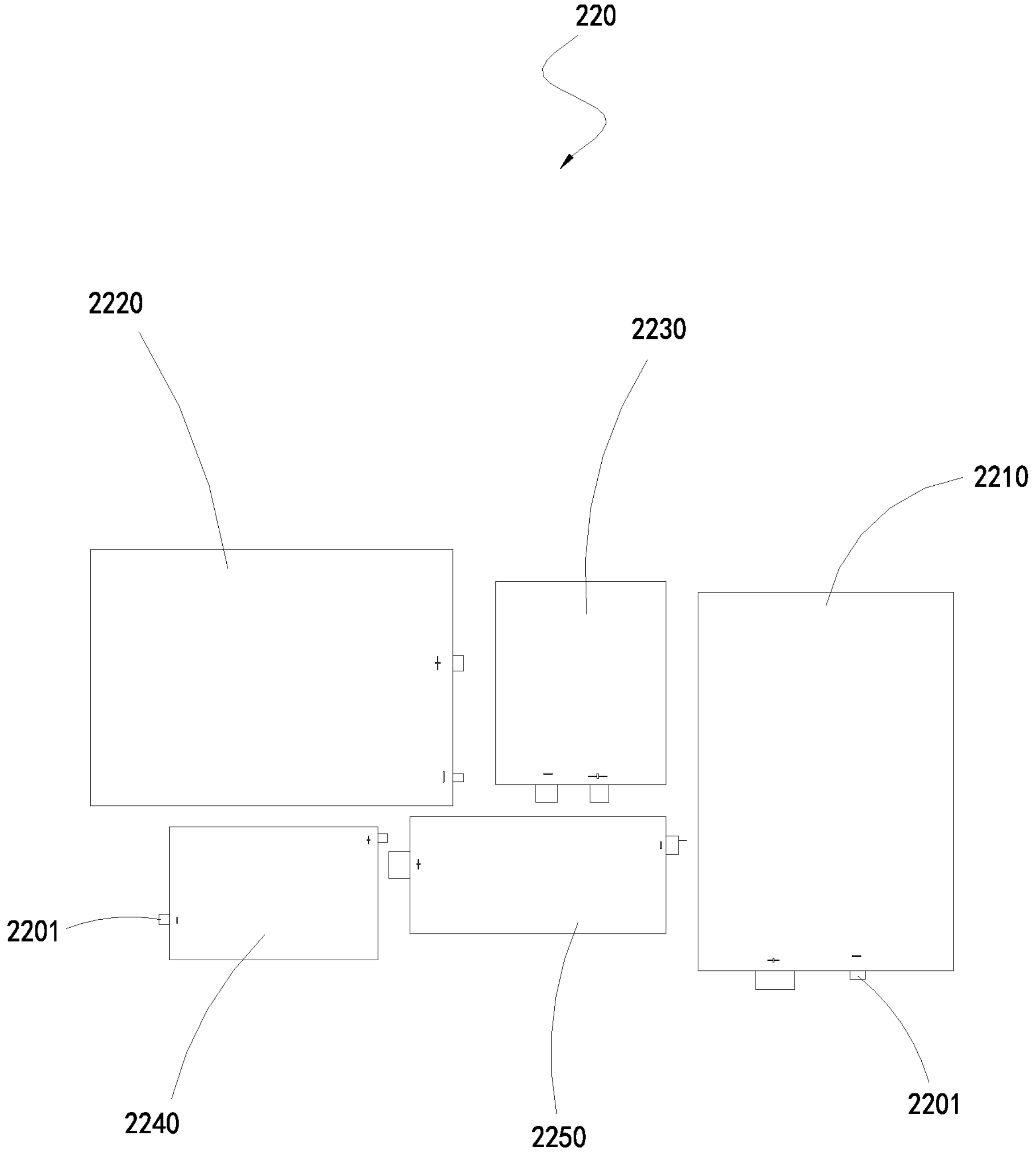
FIG. 4 is a schematic diagram of distribution of an electrode core in the battery shown in FIG. 2.
Figure 5:
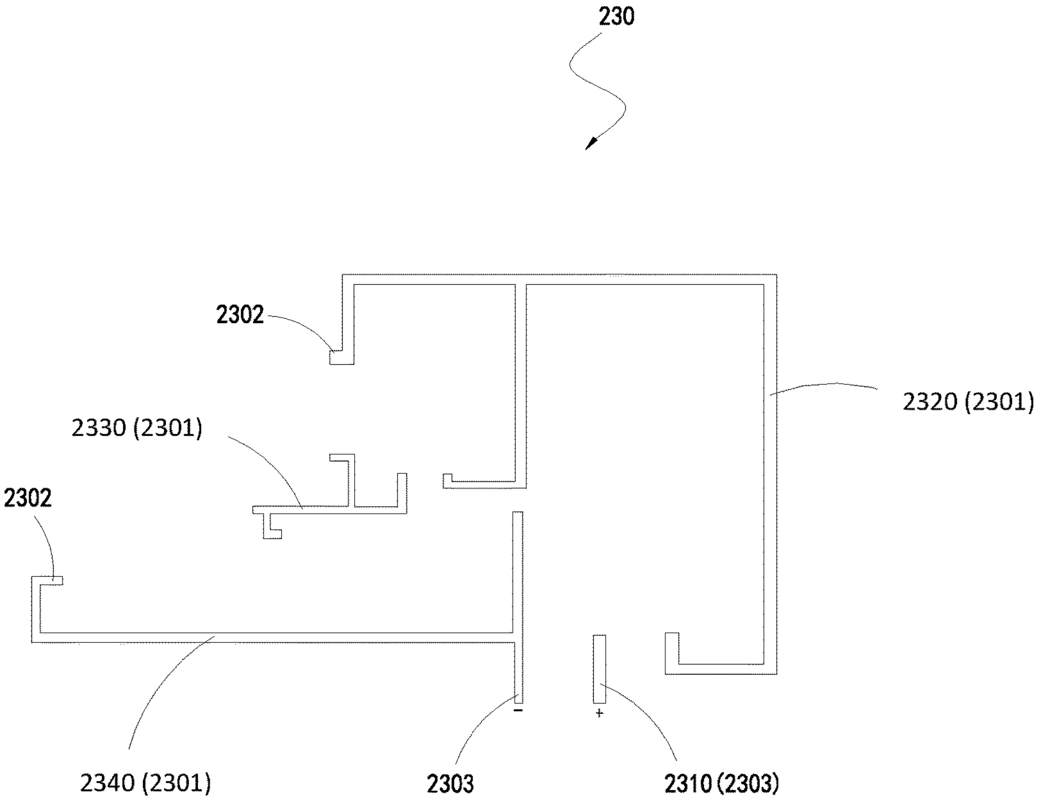
FIG. 5 is a schematic diagram of distribution of a connection wiring in the battery shown in FIG. 2.
Figure 6:
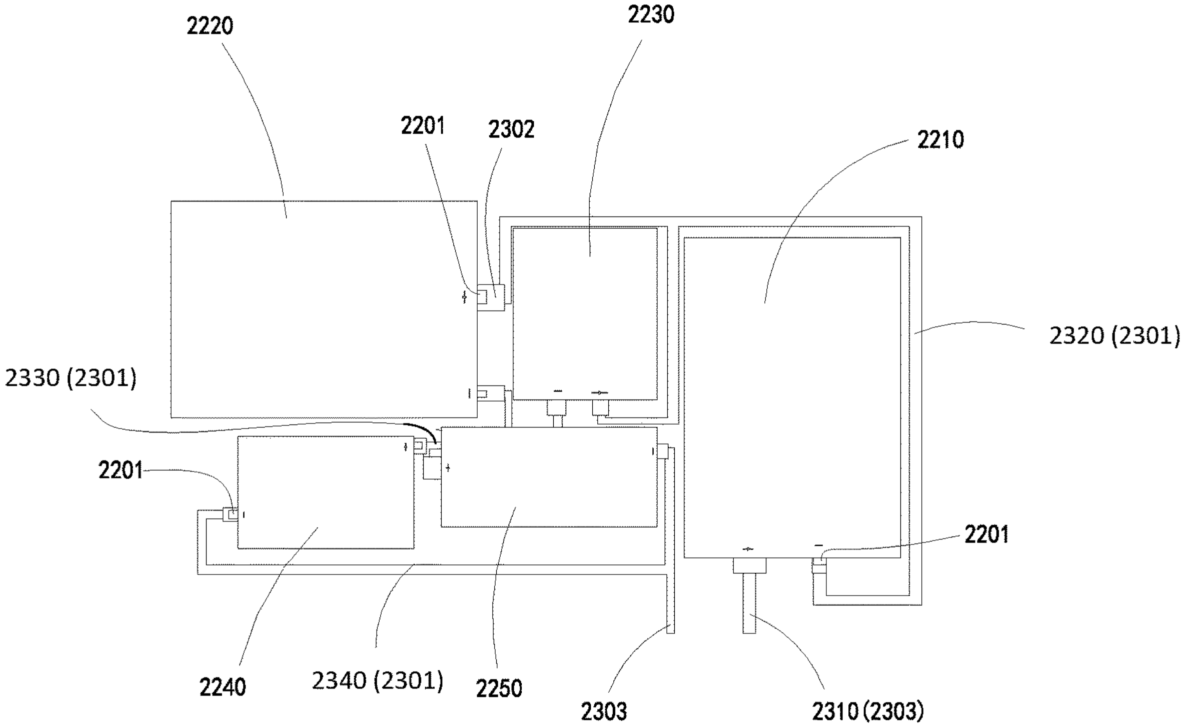
FIG. 6 is a schematic diagram of connection between an electrode core and a connection wiring in the battery shown in FIG. 2.

In addition, as shown in FIG. 3 to FIG. 5, in order to achieve the above object, the battery 20 disclosed in the embodiment of the present disclosure includes a housing 210, multiple electrode cores 220, and a connection wiring 230.

The multiple electrode cores 220 have predetermined overall dimensions and are arranged/disposed according to predetermined positions respectively. In an implementation, the electronic device 100 needs to implement a function, and the functional device 30 may be arranged/disposed in the enclosure 10 prior to the battery 20. Correspondingly, the shape and distribution of the remaining space within the enclosure 10 are also substantially determined. In this way, overall dimensions and positions of the multiple electrode cores 220 can be divided in advance according to the shape and distribution of the remaining space. Meanwhile, in order to meet the demand that the battery 20 can output power to the outside, the series and/or parallel connection relationship between the multiple electrode cores 220 can be preset to set an output current, voltage, and the like.

At least two of the electrode cores 220 have different heights, which can be set according to the volume occupation of the functional device 30. In this way, each of the electrode cores 220 may be arranged/configured in a mutual avoidance relationship with the multiple functional devices 30. That is to say, when the battery 20 is placed in the accommodating space 110, the functional device 30 of the electronic device 100 occupies a part of the accommodating space 110. For the battery 20, the overall dimension and the position arrangement of the electrode core 220 is preset according to the arrangement of the functional device 30, and the electrode core 220 is set to a height that matches the corresponding position of the functional device 30. As a result, the battery 20 substantially occupies the rest of the accommodating space 110, and realizes the full utilization of the accommodating space 110.

The predetermined position of the electrode core 220 is provided with or includes a lead-out portion 2201, so as to realize the series and parallel connection between the multiple electrode cores 220.

The predetermined position of the housing 210 protrudes outward, and multiple accommodating grooves 2101 are correspondingly formed inside the housing 210. The multiple accommodating grooves 2101 match the multiple electrode cores 220 in the overall dimensions, so as to correspondingly accommodate the multiple electrode cores 220.

The connection wiring 230 is accommodated in the housing 210 and disposed based on a predetermined serial/parallel connection relationship of the multiple electrode cores 220 and a position of the lead-out portion 2201 to electrically connect the multiple electrode cores 220. The connection wiring 230 further includes an output terminal 2303. The output terminal 2303 extends out of the housing 210 for leading out power of the battery 20.

The connection wiring 230 is accommodated in the housing and disposed based on a predetermined serial/parallel connection relationship of the multiple electrode cores 220 and a position of the lead-out portion 2201 to electrically connect the multiple electrode cores. Wires are configured in the housing 210 of the battery 20 to realize the electrical connection of the electrode core 220. The output terminal extends out of the housing for electrical lead-out, which can simplify an external circuit and reduce occupation of an internal space of the electronic device 100 by an external circuit and a component.

In an embodiment, the connection wiring further includes a wire portion 2301 and multiple connecting portions 2302 disposed on the wire portion 2301. The wire portion 2301 is disposed on a circumferential side of the electrode core 220 based on the predetermined serial/parallel connection relationship of the multiple electrode cores 220 and the position of the lead-out portion 2201. The multiple connecting portions 2302 are disposed on the wire portion 2301 and electrically connected with the lead-out portion 2201 at a corresponding position. The output terminal 2303 is disposed on the wire portion 2301.

During the implementation, the electrode core 220 may be made by winding a positive plate, a separator, and a negative plate. A tab is reserved on the positive plate and the negative plate. Accordingly, the lead-out portion 2201 may correspondingly include a positive lead-out portion and a negative lead-out portion that are formed after the winding by respectively soldering the positive tabs together and soldering the negative tabs together. The lead-out portion 2201 may be disposed on a side surface of the electrode core 220, and the lead-out portion 2201 of the multiple electrode cores 220 may be substantially disposed on a same plane, to facilitate arrangement of the connection wiring 230.

The wire portion 2301 may include multiple wire sections predetermined according to the predetermined serial/parallel connection relationship and the position of the lead-out portion. Since the multiple electrode cores 220 are different in size and specification to meet the requirements of space occupation, in order to meet the requirement for output power, the electrode cores need to be connected according to the predetermined series and parallel connection relationship. The wire portion 2301 is preset as multiple wire sections, which can more conveniently complete the predetermined serial/parallel connection, especially the series connection, according to the configuration of the electrode core 220.

To facilitate processing and molding, and to simplify the connection step, at least one of the connecting portion 2302 and the output terminal 2303 may be integrally preformed with one of the wire sections. During the implementation, the connecting portion 2302 can be integrally formed with the corresponding wire section, and the connecting portion 2302 is located at a terminal of the corresponding wire section. The output terminal 2303 includes a positive output terminal and a negative output terminal, one of which is integrally formed with a wire section, and the other one may be formed by a wire section. An outer side of the wire portion is covered with an insulating film 240, to achieve an electrical insulation protection. A part of the connecting portion 2302 and the output terminal 2303 are exposed to facilitate the electrical connection.

A spacing may exists between adjacent electrode cores 220 of the multiple electrode cores 220. The lead-out portion 2201 of each electrode core 220 needs to be connected with the connection wiring 230, and is disposed toward the spacing accordingly. Apart of the wire portion 2301 located between adjacent electrode cores 220 is embedded in a corresponding spacing. In this configuration, the electrical connection between the connection wiring 230 and the lead-out portion 2201 of the electrode core 220 is facilitated. Besides, the lead-out portion 2201 of the electrode core 220 needs to occupy a part of the space, therefore, the wire portion 2301 of the connection wiring 230 is embedded in the spacing that needs to be reserved, which is equivalent to multiplexing this part of the space. As a result, the space utilization rate is improved, and the wiring is facilitated.

During the implementation, the housing 210 may include a first packaging film 2110 and a second packaging film 2120.

The second packaging film 2120 is substantially located in the same plane, that is, the second packaging film 2120 is substantially a flat film, forming a flat side of the housing 210. During the implementation, the "substantially" here can be used for a tolerance and an error caused by an impact of machining accuracy, or a local special shape introduced due to a local design requirement, and the like. The second packaging film 2120 is generally flat.

A predetermined position of the first packaging film 2110 is recessed away from the second packaging film 2120 to form the multiple accommodating grooves 2101. A shape of each accommodating groove 2101 matches the corresponding electrode core 220.

Circumferential sides of the first packaging film 2110 and the second packaging film 2120 are respectively provided an edge sealing portion 2401. The circumferential sides of the first packaging film 2110 and the second packaging film 2120 are sealed and connected through the edge sealing portion 2401, so that the electrode core 220 and the connection wiring 230 are packaged in the enclosure 210. An outer side of the output terminal 2303 is covered with a sealant layer (not shown in the figure). The output terminal 2303 extends out of the housing 210 from the two edge sealing portions 2401. The output terminal 2303 is connected to a corresponding position of the edge sealing portion 2401 through the sealant layer for leading out power of the battery 20.

The lead-out portion 2201 of the electrode core 220 and the connection wiring 230 are disposed close to the first packaging film 2110. Neat wiring can be formed by using the first packaging film 2110, and the stress deformation can be avoided as much as possible.

As an example, as shown in FIG. 4, in an embodiment, the battery 20 includes five electrode cores 220, which are referred to as a first electrode core 2210, a second electrode core 2220, a third electrode core 2230, a fourth electrode core 2240, and a fifth electrode core 2250. These electrode cores 220 are in a rectangular shape, and each electrode core has three dimensions: length, width, and height. The width and length are respectively the dimensions of the electrode core in two directions perpendicular to the height direction. As described above, at least two of the five electrode cores 220 have different heights. During the implementation, the functional devices 30 in the electronic device 100 have different specifications, therefore, the five electrode cores 220 have different heights generally, and at least two electrode cores 220 have different widths, and/or at least two electrode cores 220 have different lengths among the five electrode cores 220. In this example, the length, width, and height of the first electrode core to the fifth electrode core are different from each other. The implementation may be set according to the requirement.

The first electrode core 2210, the second electrode core 2220, the third electrode core 2230, the fourth electrode core 2240, and the fifth electrode core 2250 are arranged/disposed in a predetermined form, and a spacing is defined between the adjacent electrode cores. The lead-out portion 2201 of each electrode core 220 needs to be connected with the connection wiring 230, and is disposed toward the spacing accordingly. As shown in FIG. 4, the positive lead-out portion and the negative lead-out portion of the second electrode core 2220 are disposed in a spacing between the second electrode core 2220 and the third electrode core 2230. The positive lead-out portion and the negative lead-out portion of the third electrode core 2230 are disposed in a spacing between the third electrode core 2230 and the fifth electrode core 2250. The positive lead-out portion of the fourth electrode core 2240 and the fifth electrode core 2250 are disposed in a spacing between the fourth electrode core 2240 and the fifth electrode core 2250. The negative lead-out portion of the fifth electrode core 2250 is disposed in a spacing between the fifth electrode core 2250 and the first electrode core 2210. The positive lead-out portion and the negative lead-out portion of the first electrode core 2210, and the negative lead-out portion of the fourth electrode core 2240 are disposed toward an outer circumferential side of the respective electrode cores.

Accordingly, in order to achieve a predetermined series-parallel connection relationship between the first electrode core to the fifth electrode core, multiple wire sections are disposed on the wire portion 2301 of the connection wiring 230. For example, as shown in FIG. 4, to realize that the first electrode core 2210 is connected in series with the parallelly connected second electrode core 2220 and the third electrode core 2230, and then connected in series with the fourth electrode core 2240 and the fifth electrode core 2250, the wire portion 2301 can be configured into four sections, that is, a first wire section 2310, a second wire section 2320, a third wire section 2330, and a fourth wire section 2340.

As shown in FIG. 5, the first wire section 2310 is connected with the positive lead-out portion of the first electrode core 2210, and is multiplexed as the positive electrode output terminal of the battery 20.

One end of the second wire section 2320 is connected with the negative lead-out portion of the first electrode core 2210, and the other end splits into two connecting portions 2302, which are respectively connected with the positive lead-out portions of the second electrode core 2220 and the third electrode core 2230.

Each end of the third wire section 2330 splits into two connecting portions 2302. The two connecting portions 2302 at one end are respectively connected with the negative lead-out portion of the second electrode core 2220 and the negative lead-out portion of the fifth electrode core 2250, the two connecting portions 2302 at the other end are respectively connected with the positive lead-out portion of the fourth electrode core 2240 and the positive lead-out portion of the fifth electrode core 2250.

One end of the fourth wire section 2340 is divided into two connecting portions 2320, which are respectively connected with the negative lead-out portion of the fourth electrode core 2240 and the negative lead-out portion of the fifth electrode core 2250, the other end is multiplexed as the negative output terminal of the battery 20.

The configuration and the connection of the wire sections may realize the series connection of the first electrode core 2210, the parallelly connected second electrode core 2220 and the third electrode core 2230, and the parallelly connected the fourth electrode core 2240 and the fifth electrode core 2250, and the positive output and the negative output of the battery 20 at the same time.

In the description of this specification, the description of the reference terms such as “an embodiment”, “some embodiments”, “exemplary embodiments”, “example”, “specific example”, or “some examples” means that the features, structures, materials, or characteristics described with reference to the embodiment or example are included in at least one embodiment or example of the present disclosure. In the present disclosure, exemplary descriptions of the foregoing terms do not necessarily refer to the same embodiment or example.

Although the embodiments of the present disclosure have been shown and described, a person of ordinary skill in the art should understand that various changes, modifications, replacements, and variations may be made to the embodiments without departing from the principles and spirit of the present disclosure, and the scope of the present disclosure is as defined by the appended claims and their equivalents.

What is claimed is:

1. A battery, comprising:

a plurality of electrode cores, at least two of the electrode cores having different heights; and each of the electrode cores comprising a lead-out portion;

a housing, having a first packaging film and a second packaging film, the first packaging film recessed away from the second packaging film to form a plurality of outward protrusions forming a plurality of accommodating grooves inside the housing; and the accommodating grooves respectively matching dimensions of the electrode cores to accommodate the electrode cores; and a connection wiring, accommodated in the housing and disposed between the first packaging film and the second packaging film based on a connection relationship of the electrode cores and positions of the lead-out portions to electrically connect the electrode cores, wherein the electrode cores and the connection wiring are enclosed between the first packaging film and the second packaging film; the connection relationship comprises a serial connection or a parallel connection; the connection wiring comprises an output terminal; and the output terminal extends out of the housing for leading out power.

2. The battery according to claim 1, wherein the connection wiring further comprises a wire portion, disposed on circumferences of the electrode cores based on the connection relationship of the electrode cores and the positions of the lead-out portions;

a plurality of connecting portions, disposed on the wire portion and electrically connected with the lead-out portions respectively; and the output terminal is disposed on the wire portion.

3. The battery according to claim 2, wherein the wire portion comprises a plurality of wire sections disposed based on the connection relationship and the positions of the lead-out portions; and at least one of the connecting portions and the output terminal is integrally formed with one of the wire sections.

4. The battery according to claim 2, wherein adjacent electrode cores are spaced apart by a gap;

and a part of the wire portion located between the adjacent electrode cores is embedded in the gap.

5. The battery according to claim 2, wherein an outer side of the wire portion is covered with an insulating film.

6. The battery according to claim 1, wherein the lead-out portions of the electrode cores and the connection wiring are disposed closer to the first packaging film than to the second packaging film.

7. The battery according to claim 1, wherein circumferential sides of the first packaging film and the second packaging film comprise an edge sealing portion, and the circumferential sides of the first packaging film and the second packaging film are sealed and connected through the edge sealing portions; and an outer side of the output terminal is covered with a sealant layer, the output terminal extends out of the housing between the edge sealing portions, and the output terminal is connected with the edge sealing portions at corresponding positions through the sealant layer.

8. The battery according to claim 1, wherein at least two of the electrode cores have different widths and/or have different lengths.

9. The battery according to claim 1, wherein each of the electrode cores comprises a positive plate, a negative plate, and a separator disposed between the positive plate and the negative plate, the positive plate, the separator, and the negative plate being wound together; and the lead-out portion of each of the electrode cores comprises a positive lead-out portion formed by soldering positive tabs of the positive plate together and a negative lead-out portion formed by soldering negative tabs of the negative plate together.

10. The battery according to claim 1, wherein the lead-out portions of the plurality of electrode cores are disposed substantially on a same plane.

11. The battery according to claim 1, wherein a shape of each of the accommodating grooves matches a shape of a corresponding electrode core.

12. The battery according to claim 1, wherein each of the electrode cores is rectangular and has a length, a width, and a height, and the length and the width are perpendicular to the height.

13. An electronic device, comprising:

an enclosure, having an accommodating space;

a plurality of functional devices, mounted to the enclosure and occupying the accommodating space; and a battery occupying the accommodating space, comprising:

a plurality of electrode cores, at least two of the electrode cores having different heights; and each of the electrode cores comprising a lead-out portion;

a housing, having a first packaging film and a second packaging film, the first packaging film recessed away from the second packaging film to form a plurality of outward protrusions forming a plurality of accommodating grooves inside the housing; and the accommodating grooves respectively matching dimensions of the electrode cores to accommodate the electrode cores; and a connection wiring, accommodated in the housing and disposed between the first packaging film and the second packaging film based on a connection relationship of the electrode cores and positions of the lead-out portions to electrically connect the electrode cores, wherein the electrode cores and the connection wiring are enclosed between the first packaging film and the second packaging film; the connection relationship comprises a serial connection or a parallel connection; the connection wiring comprises an output terminal; and the output terminal extends out of the housing for leading out power.

14. The electronic device according to claim 13, wherein the connection wiring further comprises a wire portion, disposed on circumferences of the electrode cores based on the connection relationship of the electrode cores and the positions of the lead-out portions;

a plurality of connecting portions, disposed on the wire portion and electrically connected with the lead-out portions respectively; and the output terminal is disposed on the wire portion.

15. The electronic device according to claim 14, wherein the wire portion comprises a plurality of wire sections disposed based on the connection relationship and the positions of the lead-out portions; and at least one of the connecting portions and the output terminal is integrally formed with one of the wire sections.

16. The electronic device according to claim 14, wherein adjacent electrode cores are spaced apart by a gap; and a part of the wire portion located between the adjacent electrode cores is embedded in the gap.

17. The electronic device according to claim 14, wherein an outer side of the wire portion is covered with an insulating film.

18. The electronic device according to claim 13, wherein the lead-out portions of the electrode cores and the connection wiring are disposed closer to the first packaging film than to the second packaging film.

19. The electronic device according to claim 13, wherein circumferential sides of the first packaging film and the second packaging film comprise an edge sealing portion, and the circumferential sides of the first packaging film and the second packaging film are sealed and connected through the edge sealing portions; and an outer side of the output terminal is covered with a sealant layer, the output terminal extends out of the housing between the edge sealing portions, and the output terminal is connected with the edge sealing portions at corresponding positions through the sealant layer.

20. The electronic device according to claim 13, wherein at least two of the electrode cores have different widths and/or have different lengths.

* * * * *